United States Patent [19]
Gordon et al.

[11] 3,833,017
[45] Sept. 3, 1974

[54] HYDRAULIC VALVE WITH NON-ROUND CONTROL NOZZLE

[76] Inventors: Carroll G. Gordon, 3 William Ct., Menlo Park, Calif.; William F. Stoesser, 3366 Fayette Dr., Mountain View, Calif. 94040

[22] Filed: Apr. 9, 1973

[21] Appl. No.: 348,923

[52] U.S. Cl. ............................ 137/625.62, 137/83
[51] Int. Cl. ............................................ F16k 11/00
[58] Field of Search............ 137/625.62, 625.61, 82, 137/83

[56] References Cited
UNITED STATES PATENTS

| | | | |
|---|---|---|---|
| 2,924,241 | 2/1960 | Bauer | 137/625.62 X |
| 2,973,013 | 2/1961 | Myers | 137/625.62 |
| 3,362,423 | 1/1968 | Swinehart | 137/83 |
| 3,390,615 | 7/1968 | Hayner et al. | 137/625.62 X |

*Primary Examiner*—William R. Cline
*Assistant Examiner*—Robert J. Miller
*Attorney, Agent, or Firm*—Edward D. O'Brian

[57] ABSTRACT

It is conventional to employ a round nozzle and a movable flapper in a "hydraulic means" in certain types of hydraulic or servo valves in order to control the movement of a valve member in such a valve in connecting various conventional ports. Such a valve can be improved by forming the nozzle of a shape such as an elongated rectilinear or oval which maximizes the perimeter length around the nozzle per unit of cross-sectional area of the nozzle. This maximizes the flow between the nozzle and the flapper in various positions of the flapper without a corresponding increase in the force of hydraulic fluid exerting pressure on the flapper. Several of such nozzles are normally used in a valve. The flapper in a valve as indicated is normally moved by a torque motor.

6 Claims, 4 Drawing Figures

PATENTED SEP 3 1974　　　　　　　　　　　　3,833,017
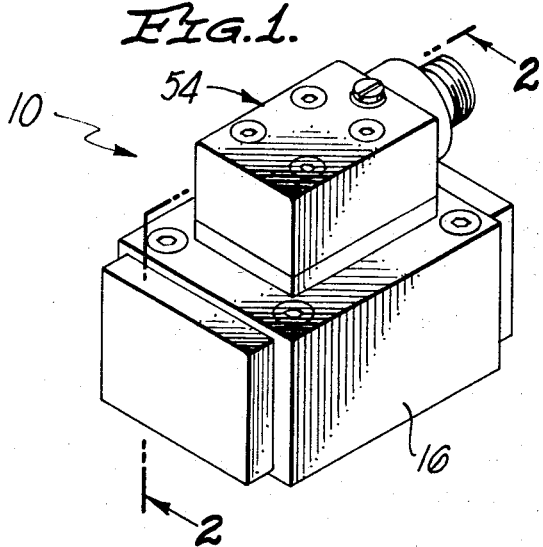
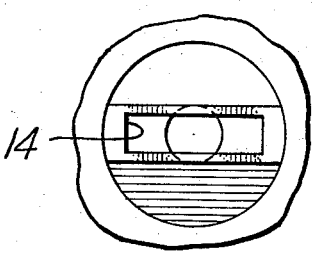
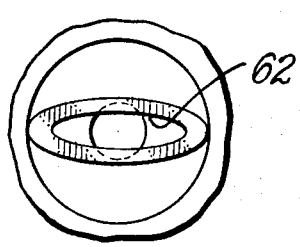
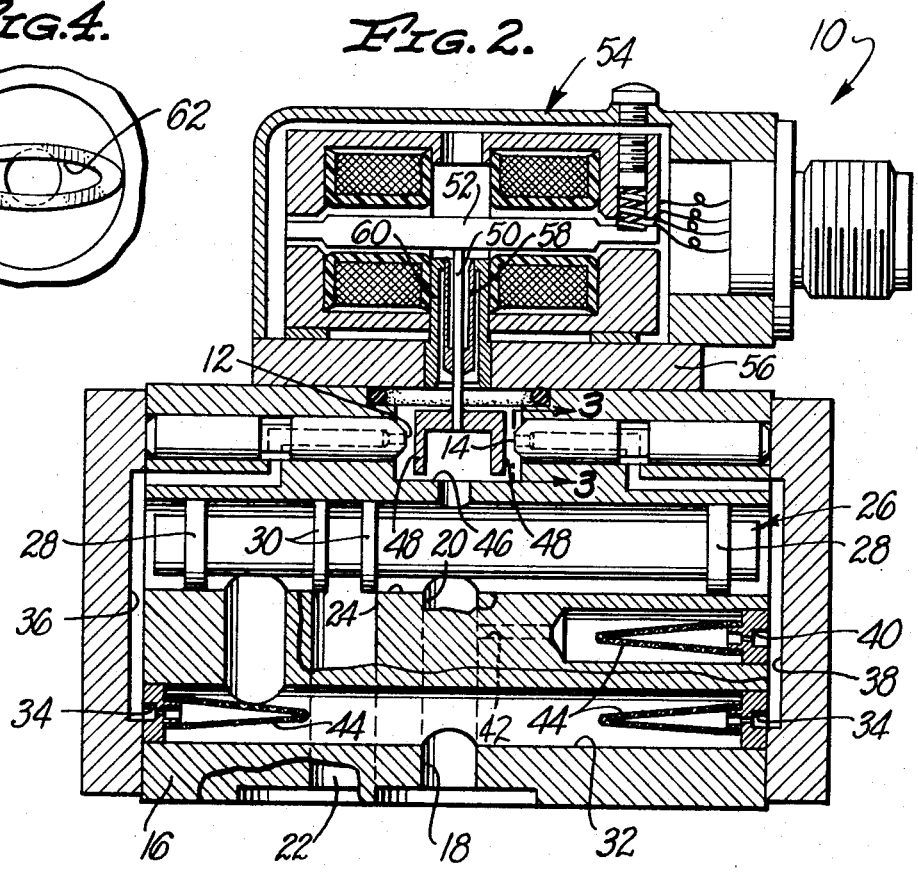

3,833,017

HYDRAULIC VALVE WITH NON-ROUND CONTROL NOZZLE

CROSS-REFERENCE TO RELATED APPLICATIONS:

This application discloses but does not claim subject matter disclosed and claimed in the co-pending U.S. patent application Ser. No. 344,135 entitled "Pressure Control Servo Valves" filed Mar. 28, 1973.

BACKGROUND OF THE INVENTION

The invention set forth in this specification pertains to hydraulic valves such as are commonly referred to as servo valves. The invention is primarily directed to valves of this category in which a "hydraulic means" such as a hydraulic amplifier is used to control the operation of the valve.

Such valves are normally constructed so as to include a valve body having a pressure port, a return port and either one or two load ports. Normally a valve member is movably mounted in the valve body so as to be capable of being moved from a position in which the ports are isolated from one another to positions in which certain ports are in communication with one another. When a valve of this type is formed so as to include two load or service ports, normally it is constructed so that the valve member may be moved so that either the pressure port or the return port is in communication with either of the load or service ports. When a valve of this type includes only one service or load port, normally it is constructed so this port can be placed in communication with either a pressure or a return port.

A number of expedients have been utilized in controlling the position of a valve member in a valve as indicated. It is not considered necessary to discuss all of such expedients in the specification since an understanding of the invention does not require the detailed analysis of the prior art. The invention set forth herein pertains to valves as indicated in which a hydraulic structure or system is utilized to control the position of the valve member. Usually such a hydraulic structure or system is referred to as a hydraulic amplifier.

Such hydraulic systems have been constructed so as to utilize either one or two circular control nozzles directed towards a movable member or flapper. The flapper in such a structure is intended to be moved in response to an applied mechanical force developed externally of a valve in order to vary the position of the flapper with respect to such a nozzle or nozzles. Normally the flapper is moved in a valve as indicated through the operation of a small electrically actuated torque motor. However, the flapper in such a valve may be moved in other ways such as through the application of a direct applied mechanical force.

In structures as indicated a hydraulic fluid moves under pressure through the nozzle or nozzles used against the flapper. The pressure exerted against a flapper by such a hydraulic fluid moving through a nozzle is, of course, proportional to cross-sectional area of the stream of hydraulic fluid emitted from the nozzle hitting against the flapper. The amount of flow from any such nozzle is, however, related to the amount of perimeter of the nozzle and the spacing of a flapper relative to the nozzle. Because of the usual construction of valves as indicated, the amount of such flow is normally comparatively limited.

On occasion it is desired to increase such flow so as to improve the performance characteristics of such valves. One way of accomplishing this would be to increase the diameter of a conventional circular nozzle as used in a valve as described. This would be disadvantageous since it would tend to increase the amount of mechanical force necessary to move a flapper against the pressure of the hydraulic fluid moving through a nozzle of increased cross-sectional area. This is disadvantageous since it is normally desired to minimize the amount of force required to move the flapper in a valve as discussed to control the operation of such a valve.

SUMMARY OF THE INVENTION

An objective of the present invention is to provide new and improved hydraulic valves. More specifically an objective of the present invention is to provide new and improved hydraulic or servo valves which employ a hydraulic means having at least one nozzle and a flapper movably mounted relative to the nozzle for controlling valve operation. A further objective of the present invention is to provide new and improved valves as indicated employing a non-round control nozzle configuration which maximizes the perimeter length around the nozzle per unit of cross-sectional area of the nozzle so as to maximize the flow between the nozzle and the flapper without a corresponding increase in the amount of force required to move the flapper.

With this invention valves can be constructed so that they have the same flow between a flapper and a nozzle as before but so that they require less force than before in order to move the flapper or they can be constructed so as to obtain a greater amount of flow between the flapper and the nozzle than in prior valves without increasing the force required to move the flapper.

Other objectives of the present invention are to provide new and improved valves as indicated which are not significantly more expensive to construct than prior related valves; which may be easily and conveniently utilized with a minimum of difficulty and which are just as reliable and effective as prior related valves. Various other objectives of the invention will be apparent from the remainder of this specification.

In accordance with this invention a hydraulic valve which includes a valve body having a pressure port, a return port, and one or two load ports, a valve member movably mounted in the valve body so as to be capable of being moved between operative positions relative to these ports and a hydraulic means for applying pressure to the valve member in order to move it between these operative positions, this hydraulic means including a nozzle through which hydraulic fluid flows during the operation of the valve and a flapper movably mounted adjacent to the nozzle so as to be capable of being moved towards and away from it is constructed so as to include the improvement comprising the nozzle having a non-round shape which maximizes its perimeter length around the edge of the nozzle per unit of cross-sectional area of the nozzle.

BRIEF DESCRIPTION OF THE DRAWING

The nature of the present invention is best more fully explained with reference to the remainder of this specification and the accompanying drawing in which:

FIG. 1 is an isometric view of a presently preferred embodiment or form of a valve in accordance with this invention;

FIG. 2 is a cross-sectional view taken at line 2—2 of FIG. 1 with parts of the valve shown being broken away to facilitate an understanding of this valve;

FIG. 3 is a partial fragmentary enlarged cross-sectional view taken at line 3—3 of FIG. 2; and FIG. 4 is a view corresponding to FIG. 3 of a modified form of a nozzle useable in accordance with this invention.

The particular valve illustrated is a specific structure including or incorporating the essentially intangible concepts of this invention set forth and defined in the appended claims forming a part of this disclosure. These concepts may be easily utilized in various hydraulic valves which are constructed differently than the specific valve illustrated through the use or exercise of routine engineering skill.

DETAILED DESCRIPTION

In the drawing there is shown an electro-hydraulic servo valve 10 in accordance with this invention which differs from a prior related valve solely in the configuration of nozzles 12 and 14 employed within this valve 10. This valve 10 is constructed so as to include a valve body 16 having a pressure port 18, a return port 20 and a service or load port 22 leading into its interior. These ports 18, 20 and 22 are all connected within the interior of the body 16 to an elongated cylindrical bore 24 in which there is located an elongated spool-like valve member 26.

This valve member 26 has end portions 28 which fit closely against the interior of the bore 24 and intermediate portions 30 which also fit closely against the interior of this bore 24. With this structure the valve member 26 may be moved slightly to either the righ or the left as it is viewed in FIG. 3 so as to place either the pressure port 18 or the return port 20 in communication with the load port 22. In a neutral or closed position of the valve member 26 these portions 30 isolate the load port 22 from the pressure and return ports 18 and 20.

In the valve body 16 a cross passage 32 forming a part of the pressure port 19 is connected through pressure reducing orifices 34 to first and second passages 36 and 38 which lead to the nozzles 12 and 14, respectively. The return port 20 is connected to the passage 38 through another pressure reducing orifice 40 by means of another cross passage 42. If desired, these orifices 34 and 40 may be protected against the accumulation of contaminants through the use of conventional filters 44.

It will be apparent from an examination of FIG. 3 that the passage 36 is open to one end of the bore 24 and that the passage 38 is open to the other end of this bore 24. As a consequence of this the position of the valve member 26 within the bore 24 will be directed by or a function of the pressure prevalent in the passages 36 and 38. With this structure the valve member 26 is exposed to both of these passages 36 and 38 so as to be movable in response to the pressures in them.

As in prior related valves these pressures will be dependent upon the amount of fluid escaping from the nozzles 12 and 14 into an internal cavity 46 connected to the return port 20. Such fluid will escape in the space around the peripheries of the nozzles 12 and 14 from the passages 36 and 38, respectively, between these nozzles and the flat sides 48 of a flapper 50. In the embodiment of the invention shown this flapper 50 is directly connected to the armature 52 of a small torque motor 54 capable of being moved so as to deflect the flapper 50 towards either of the nozzles 12 or 14 and away from the other of these nozzles.

Since the construction of the torque motor 54 is of a known type it is not described in detail herein. With the particular structure shown the base 56 of the torque motor 54 is mounted in sealed relationship against the valve body 16 so as to prevent the escape of hydraulic fluid. With this construction the flapper 50 is secured between its ends to one end of a flexible tube 58. The other end of the tube 58 is sealed with respect to a rigid tube 60 mounted on the base 56. This structure permits movement of the flapper 50 while preventing hydraulic fluid from entering the interior of the torque motor 54. Other functionally equivalent structures such as a bellows can, of course, be used for the same purpose.

In the valve 10 the nozzles 12 and 14 are constructed in order to increase the flow from the nozzles 12 and 14 over that achieved in a prior related valve having circular nozzles corresponding to the nozzles 12 and 14 without a corresponding increase in the amount of mechanical force which must be developed by the torque motor 54 in moving the flapper 50 towards either of the nozzles 12 or 14. In accordance with this invention this is accomplished by forming the nozzles 12 and 14 so that they have an elongated flat, rectangular, slot-like nozzle openings as shown in FIG. 3 having cross-sectional areas corresponding to the areas of prior circular nozzles.

If desired, the nozzles 12 and 14 in the valve 10 can be constructed in order to decrease the amount of mechanical force developed by the torque motor 54 in moving the flapper 50 towards either of these nozzles without changing the flow from these nozzles over that achieved in a prior related valve having circular nozzles. This may be accomplished in accordance with this invention by forming the nozzles 12 and 14 so that they are of en alongated, flat rectangular slot-like nozzle opening shape having an area which is decreased from the area of corresponding circular nozzles and having perimeters which are as long as the perimeters of a corresponding circular nozzle.

The importance of this flat nozzle shape is best explained with standard mensuration formula. According to such formulas a circle is a geometric shape having a minimum of peripheral length per unit of cross-sectional area. With the present invention the shape of the nozzles 12 and 14 has been changed from a conventional circular shape to a non-round configuration which maximizes the perimeter length per unit of cross-sectional nozzle area in order to increase the line area along which hydraulic fluid can escape between the flapper 50 and the nozzles 12 and 14.

The particular rectangular shape illustrated is considered preferable in maximizing the area through which hydraulic fluid can escape from the nozzles 12 and 14 in the valve 10 without increasing the amount of the areas on the sides 48 on the flapper 50 directly exposed to the hydraulic forces of the fluid moving through these nozzles. This rectangular shape is considered preferable in achieving the results indicated without unduly increasing the manufacturing problems.

It will be realized, however, that other non-round shapes may be used in connection with the nozzles 12 and 14. As an example of this, it is possible to use a comparatively, flat elliptical shaped nozzled 62 as indicated in FIG. 4 of the drawing. It is possible to utilize other more complex shapes such as cruciform shapes (not shown) in order to maximize nozzle perimeter per unit of nozzle cross-sectional area. In general, however, such complex shapes are not considered desirable because of manufacturing difficulties and on occasion because of the possibility of fluid flow at one part of a nozzle perimeter interacting with or interfering with fluid flow at another part of a nozzle perimeter.

Nozzles shaped as indicated in this discussion can easily be employed in a wide variety of different hydraulic valves. In the particular valve 10 shown, the hydraulic control means used to regulate the pressures on the ends of the valve member 26 constitutes such a hydraulic amplifier. In other valves which can benefit from the inclusion of the invention such hydraulic amplifiers may be constructed differently than indicated. Obviously, of course, the details with respect to the valve members in such other valves will be different from the details of the internal construction of the valve 10 explained in this specification.

We claim:

1. A hydraulic valve which includes a valve body having a pressure port, a return port and at least one load port, a valve member movably mounted in said valve body so as to be capable of being moved between operative positions relative to these ports and a hydraulic means for applying pressure to the valve member in order to move it between these operative positions, said hydraulic means including at least one nozzle through which hydraulic fluid flows during the operation of said valve and an imperforate flapper movably mounted adjacent to and opposite said nozzle so as to be capable of being moved through the application of mechanical force towards and away from said nozzle against the pressure of fluid emitted from said nozzle, in which the improvement comprises:

said nozzle having a non-round discharge orifice shape which maximizes the perimeter length around said nozzle per unit of cross-sectional area of said nozzle so as to maximize the fluid flow between said nozzle and said flapper while minimizing the mechanical force necessary to move said flapper towards said nozzle during the operation of said valve.

2. A valve as claimed in claim 1 wherein:
said nozzle is of a flat, rectangular, slot-like shape.

3. A valve as claimed in claim 1 wherein:
said nozzle is of a flat, elliptical shape.

4. A valve as claimed in claim 1 wherein:
there are two of said nozzles directed to opposed flat surfaces of said flapper, and
both of said nozzles have a non-round discharge orifice shape as defined in claim 1.

5. A valve as claimed in claim 4 wherein:
both of said nozzles are of a flat, rectangular slot-like shape.

6. A valve as claimed in claim 4 wherein:
both of said nozzles are of a flat, elliptical shape.

* * * * *